(No Model.)
F. W. MALLETT.
BELT CONTROLLER.
No. 419,531. Patented Jan. 14, 1890.
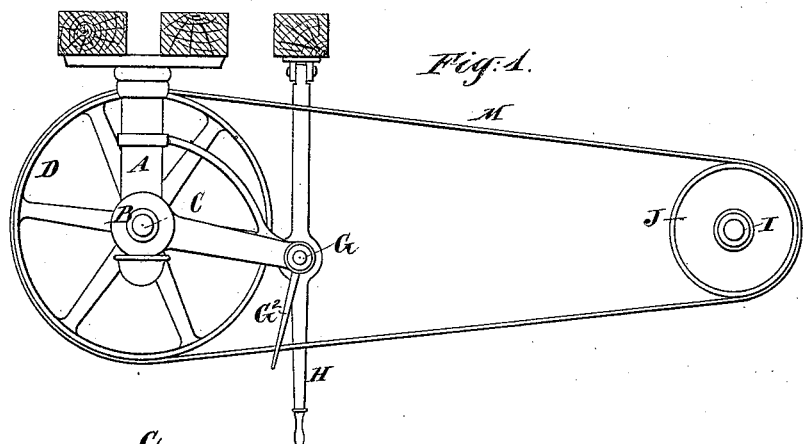
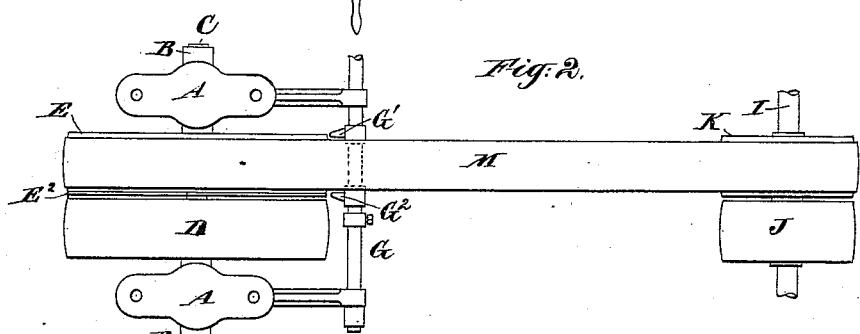
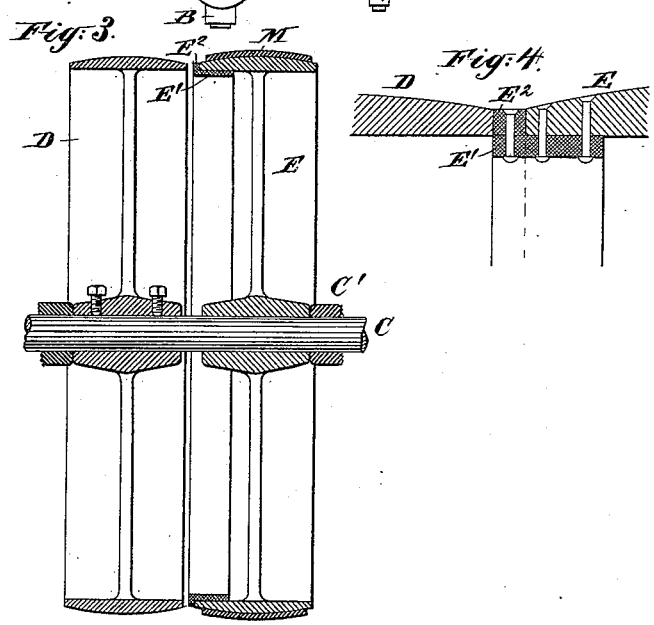
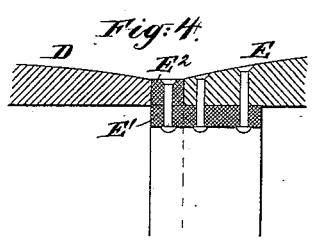
Witnesses:
Charles R. Searle
H. A. Johnstone
Inventor:
Francis W. Mallett
by his attorneys
Thomas Drew Stetson
N. PETERS, Photo-Lithographer, Washington, D. C.

UNITED STATES PATENT OFFICE.

FRANCIS W. MALLETT, OF NEW YORK, N. Y., ASSIGNOR TO DENNIS FRISBIE, OF SAME PLACE.

BELT-CONTROLLER.

SPECIFICATION forming part of Letters Patent No. 419,531, dated January 14, 1890.

Application filed December 12, 1888. Serial No. 293,349. (No model.)

*To all whom it may concern:*

Be it known that I, FRANCIS W. MALLETT, of the city and county of New York, in the State of New York, have invented a certain new and useful Improvement in Belt-Controllers, of which the following is a specification.

It has long been common to employ a driving-pulley having sufficient breadth, and to mount alongside of the driven pulley a loose pulley, the position of the belt being controlled by a suitable shifter or "shipper." The shifting of the belt from the driven pulley onto the loose pulley results in the stoppage of the machine, but the belt continues to run. In cases where the machine is used only a small portion of the time, the continued motion of the belt and pulleys when the machine is not in use consumes an appreciable amount of power and uselessly wears out the belt and pulleys. I have discovered that the belt may be allowed to stop without involving difficulty in starting or stopping.

My invention involves no change in the driven shaft or pulleys. It will be understood that there is on the driven shaft the ordinary fast pulley fixed to the shaft and the ordinary loose pulley turning idly alongside. I employ a loose pulley on the driving-shaft in a position corresponding to the loose pulley on the driven shaft, allow some end-play to the loose pulley on the driving-shaft, and so proportion the fast and loose pulleys on the driving-shaft that they shall touch each other at their peripheries when pressed together.

In what I esteem the most complete form of the invention I equip the edge adjacent to the fast pulley with a surface of leather or analogous frictional material, which will engage frictionally with the other pulley when the surfaces are brought gently together. The belt-shipper takes hold of the belt close to the pulleys on the driving-shaft.

The accompanying drawings form a part of this specification, and represent what I consider the best means of carrying out the invention.

Figure 1 is a side elevation, and Fig. 2 is a plan view. The remaining figures are on a larger scale. Fig. 3 is a central vertical section, and Fig. 4 a corresponding section, of a portion on a larger scale.

Similar letters of reference indicate corresponding parts in all the figures where they occur.

A A are hangers and B B boxes, which may be of any ordinary or suitable character, supporting a driving-shaft C, which may be a main-line shaft or a counter-shaft. It is driven by power applied at either end. (Not shown.)

D is a fast pulley rigidly keyed on the driving-shaft C and performing its usual functions.

E is a loose pulley mounted on the driving-shaft C, with liberty to move endwise to an appreciable extent. The central bosses or hubs of the pulleys D and E are short. When these pulleys are brought in contact, they will bear by their rims and not by their centers. The edge of the loose pulley E, which is presented toward the fast pulley D, is equipped with a lip of leather E', riveted to the rim and projecting outward toward the fast pulley D. Its outer edge is thickened by the addition of one or more thicknesses of leather $E^2$, and is interposed between the rim of the loose pulley E and the adjacent edge of the rim of the fast pulley D.

G is a belt-shipper mounted in ways and carrying fingers G' $G^2$, arranged to act alternately against the edges of the belt. The shipper is provided with a lever H, by which it may be shifted by hand or by cords (not shown) in the ordinary manner.

I is a shaft which is to be driven.

J is a pulley fixed on the driven shaft I. A loose pulley K is mounted alongside the fast pulley J and serves in the ordinary manner.

M is the belt. When the shipper G is moved in one direction, it runs the belt M upon the loose pulleys E and K. When it is moved in the opposite direction, the previously stationary belt M and the loose pulleys E K are slowly started by virtue of the inclination of the belt pulling the loose pulley E endwise on the shaft C and bringing its leather-clad edge $E^2$ into contact with the edge of the quickly-rotating pulley D. So soon as a slow motion is started in the loose pulley E it is communicated to the belt M, and so soon as the latter moves it is by the ordinary action of the shipper rapidly transferred more and more off the loose pulleys E K and onto the fast pulleys D J. When it is completely transferred, the driven shaft I is strongly rotated, as usual, and the loose pulleys E and K may revolve idly or stop or turn at some moderate speed, as circumstances may determine. When the shipper G is moved to stop the shaft I, it throws the belt gradually upon the loose pulley E, and gives the latter a high enough velocity to be certain to run the belt until it is quite upon the loose pulleys E K, when after a few revolutions it will stop and stand still until the shipper is again moved.

There is in all ordinary quick-running machinery sufficient momentum in the belt and pulleys to maintain the motion of the belt during the brief period required to shift it completely from the fast to the loose pulleys.

When it is required to start the machine, and the belt-shipper is moved in the direction to shift the belt again upon the fast pulleys, the effect is as follows: The shipper exerts a lateral strain on the belt, which is communicated to the loose pulley on the driving-shaft and causes the latter to move endwise thereon, bringing its leather-faced edge against the edge of the quick-running fast pulley. The friction of the rims of the pulleys causes a slow-revolving motion to be communicated to the loose pulley on the driving-shaft, and consequently to the belt and to the loose pulley on the driven shaft, and so soon as this commences the belt begins to change its position upon the pulleys in the well-known manner. So soon as the belt has shifted its position sufficiently to lap appreciably upon the fast pulley the friction of the fast pulley on the belt commences to aid the action, the speed is quickened, and the belt shifts rapidly, and the operation of starting the machine is complete.

Modifications may be made by any good mechanic without departing from the principle or sacrificing the advantages of the invention. Other means than the adjustable collar C' may be used to limit the end-play of E. I can vary the form and material of the soft edge E' E², or can dispense with it altogether and allow the metal of the loose pulley to press fairly against the metal of the fast pulley. I can mount the soft and frictional material, which I have described as leather, on the fast pulley instead of on the loose pulley. When worked either with or without the soft material E², the surfaces can be made to act more forcibly together under gentle pressure by letting one enter conically into the other; but this must not be carried so far as to cause any considerable sticking of the pulleys together when they are required to be separated.

I claim as my invention—

The loose pulley E, mounted directly but loosely on the driving-shaft C, provided with end-play and arranged to make and break frictional contact with the fast pulley D, adapted to serve with the belt M and shipper G to allow the belt to be shifted on and off the loose pulley by a lateral strain on the belt alone, as herein specified.

In testimony whereof I have hereunto set my hand, at New York city, this 22d day of November, 1888, in the presence of two subscribing witnesses.

FRANCIS W. MALLETT.

Witnesses:
CHARLES R. SEARLE,
H. A. JOHNSTONE.